358-84. OR 2,935,557 SR

SEARCH ROOM

May 3, 1960 S. F. BUSHMAN 2,935,557

APPARATUS AND SYSTEM FOR DETERMINING THE TRANSMITTING STATION TO WHICH A TELEVISION RECEIVER IS TUNED

Filed Aug. 17, 1953 4 Sheets-Sheet 1

INVENTOR.
Stephen F. Bushman
BY Mason, Kolehmainen, Rathburn & Wyss, Attys

May 3, 1960 S. F. BUSHMAN 2,935,557

APPARATUS AND SYSTEM FOR DETERMINING THE TRANSMITTING STATION TO WHICH A TELEVISION RECEIVER IS TUNED

Filed Aug. 17, 1953 4 Sheets-Sheet 2

INVENTOR.
Stephen F. Bushman
BY Mason, Kolehmainen, Rathburn & Wyss
Att'ys

APPARATUS AND SYSTEM FOR DETERMINING THE TRANSMITTING STATION TO WHICH A TELEVISION RECEIVER IS TUNED

Filed Aug. 17, 1953

INVENTOR.
Stephen F. Bushman
BY
Mason, Kolehmainen, Rathburn & Wyss
Att'ys

May 3, 1960 S. F. BUSHMAN 2,935,557
APPARATUS AND SYSTEM FOR DETERMINING THE TRANSMITTING STATION TO WHICH A TELEVISION RECEIVER IS TUNED
Filed Aug. 17, 1953 4 Sheets-Sheet 4

INVENTOR.
Stephen F. Bushman
BY Mason, Kolehmainen, Rathburn & Wyss
Attys 2,935,557

APPARATUS AND SYSTEM FOR DETERMINING THE TRANSMITTING STATION TO WHICH A TELEVISION RECEIVER IS TUNED

Stephen F. Bushman, Des Plaines, Ill., assignor to A. C. Nielsen Company, a corporation of Delaware Application August 17, 1953, Serial No. 374,761

22 Claims. (Cl. 178—5.8)

The present invention relates to a system and apparatus for determining the frequency of the carrier signal to which a wave signal receiver such as a radio or television receiver is tuned. More particularly, the present invention relates to an improved instrumented method and apparatus for determining the audience popularity of different television programs transmitted from one or more television transmitters. The present invention is an improvement on copending application Serial No. 374,593, Freeman, filed concurrently with the present application, now Patent No. 2,892,885, and assigned to the same assignee as the present application.

Heretofore there have been disclosed numerous instrumented methods and apparatus for determining the listening habits of home television receiver users. Some such means are disclosed in the following United States patents: 2,175,937, 2,305,834, 2,354,836, 2,439,201, 2,483,573, 2,484,733, 2,513,360, 2,552,585, 2,573,279, 2,618,694, 2,618,743, 2,630,366, 2,630,367, etc. Generally such devices involve the use of a recorder or indicating device operating in conjunction with each receiver utilized in the home, which home is one of a group of selected homes in a sample of homes which is chosen to be representative of a typical audience in a particular area, or on a national scale, as the case may be. Such apparatus generally comprises facilities for driving a movable record receiving element such as movable paper tape, magnetic tape or wire, movable film, or any other similar recording medium. The record receiving element is generally moved in a predetermined manner with respect to time, and associated with it is equipment for applying to the record receiving element the necessary record representative of the tuning condition of a particular television or wave signal receiver or receivers with which the recording equipment is associated.

If the record receiving element moves in some predetermined relationship with respect to time, it will be apparent that a record with respect to time will be obtained of the tuning condition of the associated received. Generally, some additional time information, as disclosed and claimed in United States Letters Patent No. 2,660,509 to Rusch, is applied to the record receiving element as a check on the predetermined movement with respect to time of the record receiving element and as a means of orientating the record obtained on the record receiving element with respect to time. The number of homes in the sample of homes representative of the radio or television audience may be varied, and a sufficient number will be chosen to produce an accurate sample which is representative of the class of listeners and viewers in the area under consideration. These homes are chosen on a basis whereby all variable factors, such, for example, as the number of potential listeners, economic affiuence, religion, etc., which normally affect any process of sampling public opinion, are accounted for on a correctly weighted basis. Such instrumented methods have utilized a wide variety of apparatus all the way from relatively simple mechanical devices to much more complicated devices involving electromechanical as well as electronic elements. The more complicated arrangements have been necessitated by virtue of the complexity of the wave signal receivers being monitored, and also the difficulty and, in fact, impossibility in many cases of attaching simple means to receivers to be monitored for indicating the tuning condition thereof.

In recent years the television audience in the United States as well as elsewhere has increased by leaps and bounds, and the home television audience is becoming a larger and more important segment of the home wave signal receiver audience than is the home radio audience. In fact, in many urban centers the radio audience has been greatly reduced in recent years. Simple mechanical means for indicating the position of the tuning shaft of television receivers is complicated by the fact that, in general, the tuning shafts of television receivers comprise the inner one of a pair of concentric shafts. Likewise, in order to prevent what is known as conditioning the sample, it is desirable that the collaborator's receiver which is being monitored is one owned by the collaborator, and to which is attached a suitable recording means. Obviously, the statistical choice of collaborator homes may require the monitoring of a large number of different types and kinds of receivers. This is a difficult problem when it is remembered that there are literally hundreds of different television receivers being manufactured today. Many of these receivers are expensive devices costing from hundreds of dollars to even more than a thousand dollars, and the collaborator is not very agreeable to permitting the making of complicated changes or the addition of elaborate monitoring equipment with such a receiver. Consequently, it is desirable to provide instrumented means for indicating and recording the viewing habits of television receivers in view of their greatly increased popularity, which provides a minimum of equipment, which can be kept in a compact place, preferably within the cabinet of the receiver being monitored, which can be applied to the monitored receiver in a very simple manner without in any way interfering or requiring substantial changes in the receiver itself, and which is foolproof in operation, producing a continuous record of the tuning condition of the particular receiver, or, in the case of multireceiver homes, a record of the tuning condition of several receivers.

As in the above-mentioned Freeman application, the present invention is concerned primarily with an improved arrangement for modulating the incoming signal to a wave signal receiver by a selective device and sensing this modulation by a circuit connected at some point in the wave signal receiver following the receiver selective circuits. In the Freeman application there is disclosed and claimed an arrangement wherein a modulation component is applied by means of an absorption modulator to the incoming signal of a wave signal receiver. Several modulating arrangements for bleeding energy from the incoming signal and detecting this modification of the incoming signal when there is frequency coincidence between the resonant frequency of the absorption modulator and the incoming signal are disclosed in this Freeman application. The disclosed modulating arrangements produced an innocuous modulation by virtue of the choice of modulating frequency applied, or, if not innocuous, use is made of lockout means to render the modulating means ineffective as soon as the channel to which the receiver is tuned has been determined. The Freeman application also taught, in the case of monitoring a television receiver, that the absence of the horizontal synchronizing pulses during a receiver retuning operation could be employed to recycle the metering equipment, or, in other words, to render the lockout means ineffective.

It would be desirable to provide a receiver monitoring means particularly adaptable for use with television receivers wherein no lockout means are necessary and yet wherein the modulating signal in no way impairs the television reception. It would also be desirable to provide an arrangement in which no separate source of modulation components is necessary and wherein some component of the incoming television signal may be utilized to apply a modulation component to a later incoming signal.

Accordingly, it is an object of the present invention to provide a new and improved apparatus and system for determining the listening and viewing habits of television receiver users.

It is another object of the present invention to provide an arrangement for monitoring television receivers wherein a modulation component is applied to a portion of the incoming television signal in a manner so that it can in no way impair the television reception.

It is a further object of the present invention to provide a simple and compact arrangement for monitoring television receivers which utilizes a component of the horizontal synchronizing pulses to modulate the incoming signal to determine the tuning condition of the television receiver.

Still another object of the present invention resides in the provision of an improved means for modulating the incoming signal to a television receiver and sensing this modulation by a circuit connected to some point following the selective circuits of the television receiver.

Further objects and advantages of the present invention will become apparent as the following description proceeds, and the features of novelty which characterize the invention will be pointed out with particularity in the claims annexed to and forming a part of this specification.

For a better understanding of the present invention, reference may be had to the accompanying drawings in which.

Figure 1:
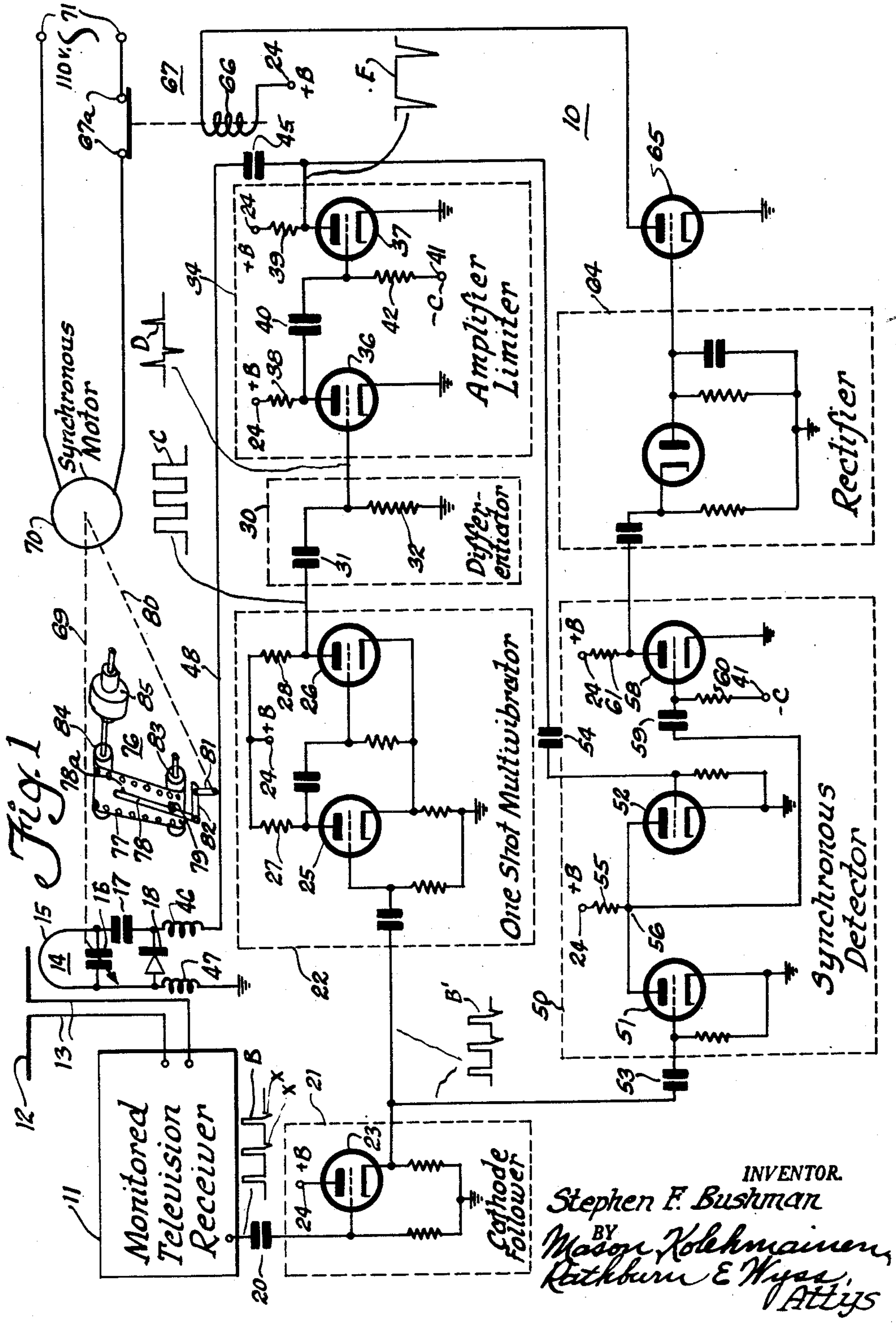
Fig. 1 is a schematic diagram illustrating a system and apparatus for monitoring a television receiver in accordance with the present invention.
Figure 3:
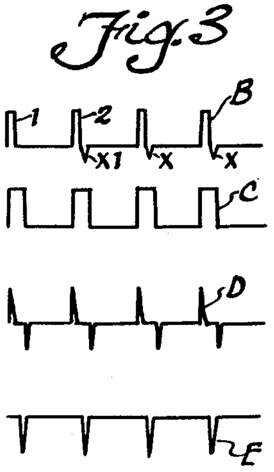
Figure 5:
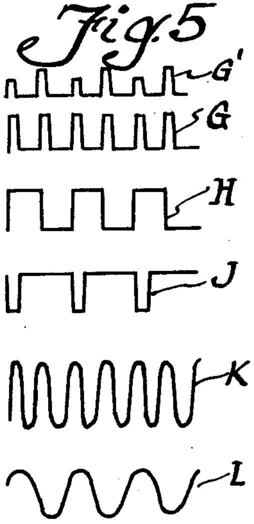
Figure 4:
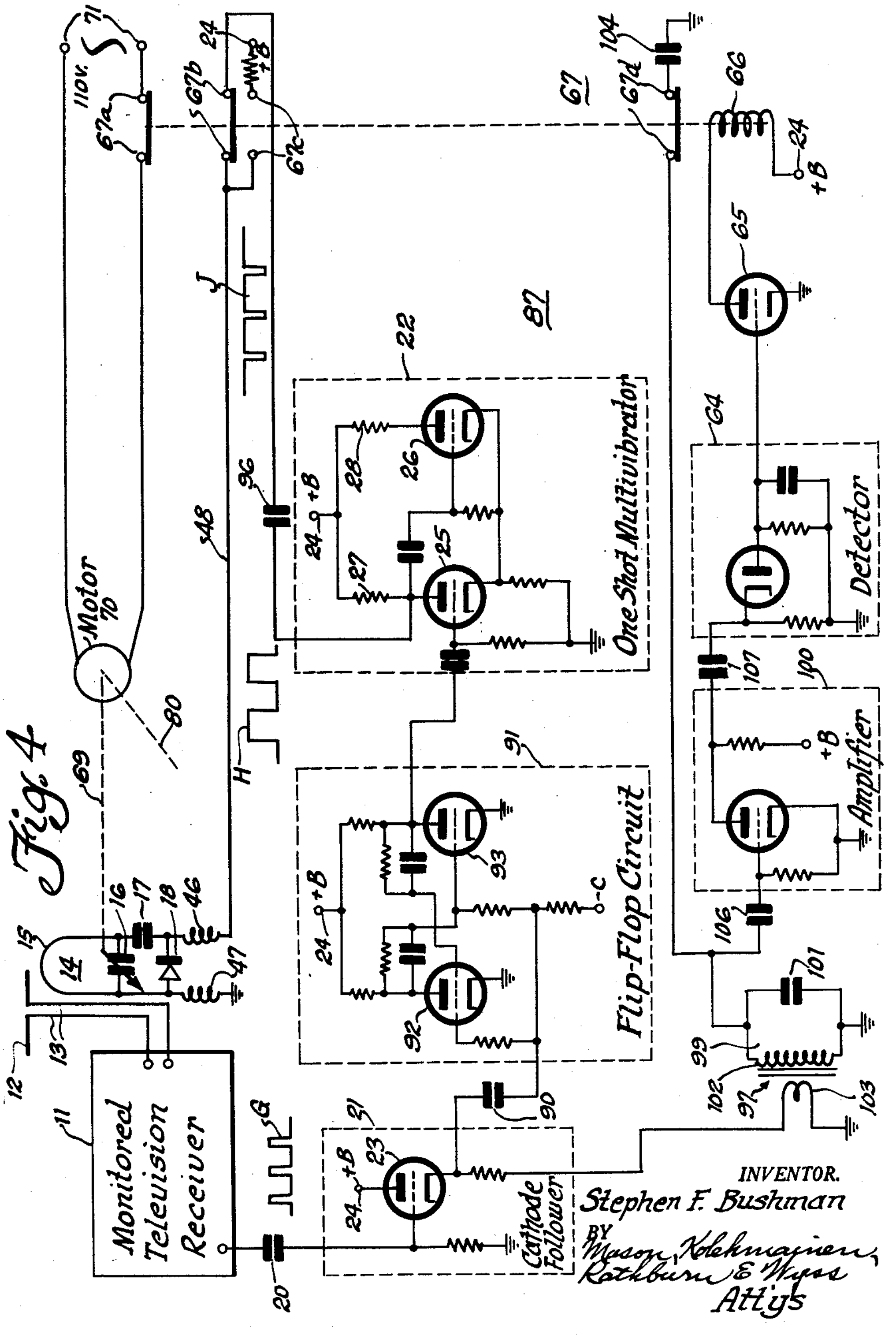
Figure 6:
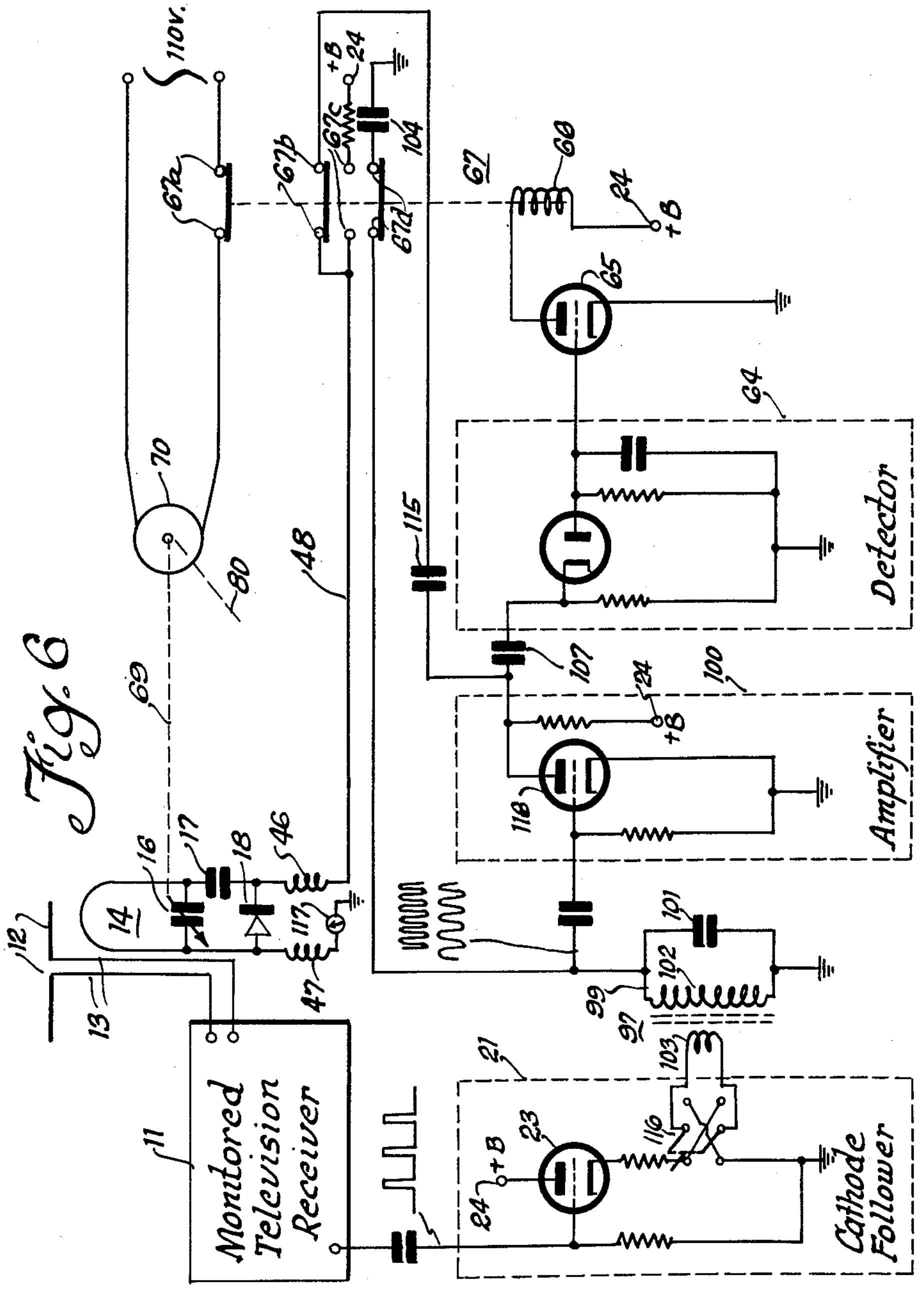

Fig. 3 comprises a series of curves designated by the nomenclature B, C, D and E, shown in correct time relationship to indicate signals appearing at various points in the system of Fig. 1 under certain predetermined conditions;

Fig. 4 is a schematic view similar to Fig. 1 illustrating another embodiment of the present invention;

Fig. 5 comprises a series of curve diagrams specifically designated by the nomenclature G, H, J, K and L to indicate in time coincidence signals appearing at various points in the circuit of Fig. 4; and Fig. 6 is another schematic diagram of a system and apparatus illustrating a modification of Fig. 4.

Figure 2:
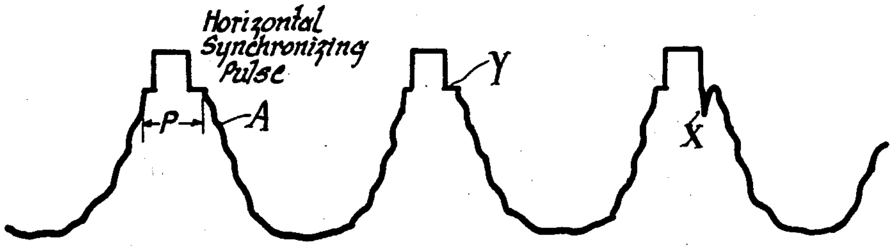
Fig. 2 is a curve diagram to aid in understanding the operation of the invention disclosed in Fig. 1 of the drawings.

In accordance with one embodiment of the present invention use is made of the fact that a television signal includes certain periods such as between the end of one line and the beginning of the next, or between the end of one frame and the beginning of the next, upon which modulation can be placed without in any way impairing the operation of the television receiver. It is, of course, important that these periods which are used to place modulation on the television signal do not coincide with the synchronizing pulses. Obviously, to make sure that this is the case, the modulation components must be synchronous with the synchronizing information and disposed on the television signal at a point not normally used for intelligence or synchronizing pulses. In one embodiment of the present invention, it is intended to place a modulation component on what is commonly termed the "back porch" portion or pedestal of the television signal immediately following the horizontal synchronizing pulses. In Fig. 2 of the drawings there is illustrated an oscillogram of three successive lines of a television picture signal, which curve is represented as A in Fig. 2 of the drawings. The pedestal portion of the television signal A has a width which is indicated by the letter P in Fig. 2 of the drawings. This pedestal portion includes the horizontal synchronizing pulse so designated in Fig. 2 of the drawings. The pedestal, however, includes a short portion preceding the synchronizing pulse, and a somewhat longer portion following the horizontal synchronizing pulse. The remainder of the curve A, exclusive of the pedestal portion, comprises the wave form of the television signal including the intelligence included thereon. It will be apparent that information or a modulation component can be placed anywhere on the pedestal of the television signal exclusive of the portion taken up by the horizontal synchronizing pulse. The so-called "back porch" of the television signal is the portion designated by the letter Y in Fig. 2 of the drawings immediately following the horizontal synchronizing pulse, and it is in this area that a modulation component for determining the tuning condition of a television receiver may be placed. As a matter of fact, the first two lines of the television signal of Fig. 2 show this "back porch" area without any modulation component associated therewith, whereas the third line of the television picture shows a sort of notched portion X in this "back porch" area indicating the inclusion thereon of a modulation component. It will be apparent that any modulation component of restricted amplitude placed in this area of the television signal will be completely innocuous, and any means for producing a modulation component in that area can be continuously operative without impairing the television picture or reception.

Referring now to Fig. 1 of the drawings, there is illustrated a system and apparatus for applying a modulation component to a portion of a television signal not otherwise used for intelligence or synchronizing purposes whereby the combined tuning condition of a television receiver 11 with which the apparatus is combined can be determined and recorded as described hereinafter. It will be understood that a large number of the television receivers similar to 11, representative of the television audience in a particular area, will be monitored, whereby it is possible to have a complete record of the listening or viewing habits of the television audience in a particular area or throughout the United States, for example. If a particular home has more than one television receiver, then it is preferable to monitor all the television receivers in that home in order to obtain an indication of the viewing and listening habits of the television audience in the home. It will be understood that the television receiver 11 is provided with a suitable antenna designated by the reference numeral 12 and indicated schematically as a dipole antenna. As illustrated, the antenna 12 is connected to the receiver 11 by a suitable transmission line 13, which may be the conventional twin lead transmission line commonly used with television receivers, or, in the case of ultra high frequencies, a coaxial cable type transmission line.

In the above-mentioned copending Freeman application, there is disclosed an absorption modulator circuit inductively and capacitively coupled with the transmission line connected to the television receiver and tunable over the frequency range of the receiver 11, so that when the absorption modulator circuit is tuned to the same frequency as that to which the receiver is tuned some sort of modulation component is applied to the incoming signal. In Fig. 1 of the drawings there is disclosed an identical absorption modulator circuit designated by the reference numeral 14 and comprising an inductance element 15 and a variable tuning condenser 16. The tuning condenser 16 may be adjusted to vary the resonant frequency of the tuned circuit 14 over the frequency range capable of being tuned in by the wave signal receiver 11.

When the frequency of the tuned circuit 14 corresponds to the frequency of the signal tuned in by the receiver 11, the coupling of the tuned circuit 14 with the transmission line will cause energy to be bled therefrom, thus, in effect, applying a modulation component to the incoming signal. It will be understood that, as disclosed in the above-mentioned Freeman application, this modulation component instead of being produced by bleeding energy from the incoming signal may be produced by adding or otherwise modifying the energy of the incoming signal.

For the purpose of producing a modulation component, there is connected across the tuned circuit 14 a high frequency by-pass condenser 17 and a diode 18. Whenever the diode 18 is conductive, there is effectively applied to the tuned circuit 14 a resistive shunt, so that the tuned circuit is incapable of modulating the signal on the transmission line 13 by bleeding energy therefrom. On the other hand, when the diode 18 is non-conductive and the circuit 14 is resonant with the signal tuned in by the receiver 11, the absorption modulator circuit 14 is rendered effective to bleed energy from the incoming television signal. This absorption modulator circuit 14 is connected to the means, generally designated by the reference numeral 10, for determining the tuning condition of the monitored receiver 11. The diode 18 may be a germanium diode, in which case its back resistance will provide the necessary direct current path. If diode 18 is a thermionic diode, a direct current path in the form of a resistor connected across the diode should be provided.

The means, 10, which comprises a plurality of electron discharge tubes and the like, is primarily provided for the purpose of placing a modulation component in the form of a notch on the pedestal of the television signal immediately following the horizontal synchronizing pulse when the resonant frequency condition of the absorption modulator circuit 14 coincides with the frequency of the signal tuned in by the receiver 11, and, moreover, detecting the presence of such notch in the signal received by the receiver and producing a record of the presence of such notch in a manner to be indicative of the tuning condition of the receiver 11. In accordance with the present invention, there is obtained from the receiver 11 an output signal which includes the horizontal synchronizing pulses. This may be obtained from certain lower frequency portions of the receiver following the tunable high frequency section thereof, and these signals are represented by the curve B shown in Figs. 1 and 3 of the drawings. These signals are supplied through a coupling capacitor 20 to a cathode follower 21. The cathode follower produces a low impedance output almost exactly like its input. The output of the cathode follower 21 is supplied to a one shot multivibrator 22 which produces an output pulse somewhat broader than the input pulse represented by the curve C of Figs. 1 and 3 of the drawings. The particular construction of the cathode follower 21 and the one shot multivibrator 22 are immaterial as far as the present invention is concerned, and a circuit configuration is employed to accomplish the desired signal change. As illustrated, the cathode follower comprises a triode 23 having its plate circuit connected to a source of +B potential 24. The one shot multivibrator 22, on the other hand, comprises a pair of triodes 25 and 26, whose plates are each connected to the source of +B potential 24 through resistors 27 and 28, respectively.

For the purpose of producing a signal having a downward notched configuration immediately following the horizontal synchronizing pulses, the output of the one shot multivibrator 22 is fed to a differentiating circuit 30 comprising the conventional capacitor 31 and resistor 32. This differentiating circuit produces a sharp upward pulse at the leading edge of the broad upward pulse from the one shot multivibrator, and a similar downward pulse at the trailing edge of the broad pulse obtained at the output of the one shot multivibrator to produce a signal output represented by the curve D, as shown in Figs. 1 and 3 of the drawings. Since only the downward pulse immediately following the horizontal synchronizing pulse is desired, the output from the differentiator 30 is supplied to an amplifier-limiter 34 which removes the unwanted upward pulses shown by the curve D, and which amplifies the downward pulse which is desired to produce an output represented by the curve E in Figs. 1 and 3 of the drawings, the downward pulses of the curve E occurring immediately following the horizontal synchronizing pulses, and in effect, occurring in the pedestal portion as represented by the third picture line of Fig. 2 of the drawings. This position of the downward pulses of curve E relative to the position of the horizontal synchronizing pulses can readily be appreciated by a comparison of curves B and E of Fig. 3 of the drawings. The amplifier-limiter 34 may comprise any suitable device for this purpose and is illustrated as comprising a pair of triodes 36 and 37. The plate circuits of the triodes 36 and 37 are each connected to a source of +B potential 24 through suitable resistors 38 and 39, respectively. The plate circuit of the triode 36 is coupled to the control electrode of the triode 37 through a suitable capacitor 40. Furthermore, the control electrode of the triode 37 is connected to a source of negative biasing potential 41 designated as −C, through a suitable resistor 42. The electron discharge tube 36 is operated at zero bias, so that it is normally conductive. Whenever the negative pulse or downward portion of the signal represented by the curve D is applied to the control electrode of tube 36, its conductivity is decreased and a positive pulse appears at the output. This positive pulse is amplified and inverted by the electron discharge valve 37 to produce the output represented by the curve E comprising a series of negative pulses occurring immediately following the horizontal synchronizing pulses and synchronous with the horizontal synchronizing pulses. This can best be appreciated from an examination of Fig. 3 of the drawings, where the curves B, C, D and E of Fig. 1 are shown all related to the same zero axis.

In order that the downward notch produced in synchronism with the horizontal synchronizing pulses may be applied to the incoming television signal supplied to the receiver 11, the output of the amplifier-limiter 34 is coupled to the absorption modulator circuit 14 through a coupling capacitor 45 and a conductor 48. In addition to the high frequency by-pass condenser 17 already described, suitable isolating choke coils 46 and 47 are interposed between the absorption modulator circuit 14 and the output of the amplifier-limiter 34, thereby preventing the impedance between the lead 48 and ground from affecting the tuning of the circuit 14. When the frequency of the tuned circuit represented by the absorption modulator circuit 14 coincides with the frequency to which the receiver 11 is tuned, the absorption modulator 14 will be rendered effective. Under these conditions, the diode 18 is rendered nonconductive at the instants of the negative pulses, and the absorption modulator bleeds energy from the incoming signal during these instants to reduce the amplitude and hence, in effect, apply downward notches, represented by the portions X in curve B of Figs. 1 and 3 of the drawings and also in the pedestal portion of the third synchronizing pulse of the curve A shown in Fig. 2 of the drawings.

It will be apparent that if means are provided to detect the presence of the notches X in the television signal received by the receiver 11, there will be obtained an indication that the absorption modulator circuit 14 has its frequency coincident with that to which the receiver 11 is tuned. If at that instant information is available as to the position of the tuning element of capacitor 16, a record of the tuning condition of the receiver 11 can readily be made. Before describing how the record of the tuning condition can be made, a description will first be included of the apparatus for recognizing the presence of the downward notches X in the television signal received by the receiver 11.

In order to detect the presence of the downward notches X, any suitable means may be employed. It will be apparent that a simple type of detector for this purpose would be a synchronous detector which would produce an output only upon coincidence of downward notches in the signal received by the television receiver with the downward notches in the signal at the output of the amplifier-limiter 34. To this end there is provided a coincidence or synchronous detector, generally designated by the reference numeral 50, which comprises a pair of triodes 51 and 52. The output of the cathode follower 21, which output signal is represented by the curve B' in Fig. 1 of the drawings, is coupled to the control electrode of the triode 51 through a suitable coupling capacitor 53. Similarly, the output of the amplifier-limiter 34, represented by the curve E of Fig. 1 of the drawings, is coupled through a suitable coupling capacitor 54 to the control electrode of the triode 52. The plates of the triodes 51 and 52 are connected to the source of the +B potential 24 through a resistance 55. The triodes 51 and 52 preferably normally draw heavy plate currents with a low plate voltage. The triodes 51 and 52 will have a greatly reduced output when a negative potential is applied to the control electrodes thereof. Thus, if both triodes 51 and 52 are simultaneously turned off, there will be a high positive pulse appearing at the output of the synchronous detector represented by terminal 56. It will be apparent that if there is not a coincidence of negative pulses supplied to the control electrodes of both triodes, there will be only a relatively small change in potential of the terminal 56. Preferably, there is included in the synchronous detector 50 an additional triode 58 coupled to the terminal 56 through a coupling capacitor 59. A high negative bias is applied to the control electrode of the triode 58 from a source of —C potential, designated as 41, through a resistor 60. The plate of the triode 58 is connected to a +B potential source 24 through a resistor 61. The triode 58 is, in effect, a potential inverter which will convert the positive potential output obtained at terminal 56 upon coincidence of the negative potentials supplied to the synchronous detector from the cathode follower 21 and the amplifier-limiter 34 to negative potentials.

In accordance with the present invention the negative output obtained from the synchronous detector 50, upon the coincidence of the negative pulses in the signal supplied thereto, is supplied to a rectifier 64 which, in turn, applies a negative bias to the control electrode of a relay control tube 65 whose plate circuit is connected to the source of +B potential 24 through the winding 66 of a motor control relay 67 having a single set of contacts **67*a*. The relay 67 is indicated in the energized condition to close its contacts 67*a*. It should be understood, however, that the presence of a negative output from the rectifier 64 will cause the relay control tube 65 to become effectively nonconducting, and, therefore, deenergizes the relay 67.**

In accordance with the present invention, the absorption modulator circuit 14 has the resonance frequency thereof varied in a cyclic manner, as preferably one cycle per minute. To accomplish this, the movable or adjustable element of the capacitor 16 is illustrated as being connected by a shaft or driving means 69 to a synchronous motor 70, which, in turn, is energized from a suitable source of alternating current indicated at 71 and connected to the synchronous motor 70 through the contacts **67*a* of the relay 67. As long as the relay 67 is energized, the synchronous motor 70 will cause the absorption modulator circuit 14 to sweep the television frequency spectrum. Whenever the synchronous motor 70 reaches a position such that the absorption modulator 14 is tuned to a resonant frequency coincident with the frequency to which the receiver 11 is tuned, the modulation component produced at the output of the amplifier-limiter 34 is applied to the incoming television signal to produce the distorted television signal represented by the curve B in Figs. 1 and 3 of the drawings. The presence of this downward notch in the pedestal of the television signal is detected in the synchronous detector 50 which biases the control electrode of the tube 65 sufficiently negative to deenergize the relay 67 and stop the synchronous motor 70. The position of the synchronous motor 70 is indicative of the tuning condition of the receiver 11.**

Any suitable means for producing a record of the position of the synchronous motor 70 may be employed in order to produce a record or a continuous indication of the tuning condition of the receiver 11. It will be apparent that the most obvious arrangement for recording the tuning condition of receiver 11 would be a mechanical link between the motor 70 and the stylus of a suitable recorder. Such a recording arrangement is schematically indicated in Fig. 1 by the reference numeral 76. The recorder 76 is very similar to the recorder disclosed in United States Letters Patent No. 2,618,743, granted November 18, 1952, and assigned to the same assignee as the present application. As there illustrated, the recorder 76 includes a movable record receiving element 77 upon which recordings are produced by means of an oscillating stylus 78 having an inscribing portion **78*a* adapted to move transversely of the record receiving element 77. The stylus 78 is mounted for oscillating movement about a pivot 79. The oscillating movement of the stylus 78 is obtained by means of a driving connection with the synchronous motor 70. This driving connection preferably comprises a reduction gear mechanism not shown, a shaft 80, a crank 81, and a link 82. The movable record receiving element 77 is preferably moved at a constant speed from a supply spool 83 to a take-up spool 84 by means of a synchronous motor 85 connected to the take-up spool 84. When the synchronous motor 70 is rotating, it will be apparent that the inscribing portion 78*a* of the stylus 78 will move transversely of the record receiving element 77. When the motor 70 is deenergized, the inscribing portion 78*a* will be maintained at a predetermined position determined by the particular tuning condition of the receiver 11, and a straight line record, due to movement of the record receiving element 77, will be produced. Obviously, as far as the present invention is concerned, any other suitable means for producing a record may be employed. If desired, a suitable position switch may be connected to the motor 70 to translate the angular position of the shaft 80** to suitable electrical signals, which electrical signals may, in turn, be used to control a suitable recording device. Such position switch arrangements are fully disclosed in a copending application, Serial No. 147,302, Krahulec, filed March 2, 1950, now Patent No. 2,838,359, issued June 10, 1958, and assigned to the same assignee at the present application.

With the above apparatus it will be apparent that the modulation component will be superimposed on the incoming television signal whenever the receiver is tuned to a particular channel. Since this modulation component is superimposed on the portion of the television signal not used for any purpose, it will in no way interfere with the reception and will be completely innocuous. There is, therefore, no reason to interrupt the production of the modulation component during this time, and no lockout arrangement such as is described in the copending Freeman application is necessary. It will, moreover, be apparent that upon retuning of the receiver 11 to a different channel, the notch pulses will disappear, and, consequently, the negative bias applied from the rectifier 64 to the control electrode of the relay control tube 65 will disappear, permitting the relay 67 to be energized and causing the synchronous motor 70 to operate the absorption modulator circuit 14 to sweep the frequency spectrum. As soon as the receiver 11 is tuned to a new channel, horizontal synchronizing signals are again present, and the modulating signals described above are again applied to the modulator 14. However, no notch will appear in the output signal of the cathode follower 21 until the absorption modulator 14 is tuned to a resonant frequency equal to that of the signal frequency to which the receiver 11 is tuned.

In view of the detailed description included above, the operation of the present invention will readily be appreciated by those skilled in the art and no further discussion thereof is included herewith. It will be appreciated that no separate source of modulation component was required and, instead, a modulation component was obtained by deriving one from the television signal itself.

There has been some indication that the so-called "back porch" of the video signal will be employed in connection with color television. If that should be the case, it will be apparent that the arrangement of Fig. 1 will not be usable for monitoring television signals which already include modulation on this "back porch" portion of the signal. In Fig. 4 of the drawings there is illustrated a system and apparatus embodying the present invention which obviates the use of the "back porch" area of the television signal. In Fig. 4 the corresponding parts are designated by the same reference numerals as in Fig. 1 of the drawings. As in the preceding embodiment, it is desirable to supply the absorption modulator circuit 14 with a modulation component without requiring an external source of modulation which can be applied to the incoming television signal and then detected at some point in the receiver following the frequency selector circuits. It will be appreciated that the horizontal synchronizing pulses have a frequency of 15.75 kilocycles, and it is readily possible by means of various circuits to convert the 15.75 kilocycle signal to one having half that frequency, or, in other words, 7.88 kilocycles. In accordance with the present invention, therefore, there is applied to the absorption modulator circuit 14 a signal having a frequency of 7.88 kilocycles.

Referring now to Fig. 4 of the drawings where the system and apparatus is generally designated by the reference numeral 87, there is employed the same cathode follower 21 to which is supplied a suitable signal obtained from the receiver 11 including the horizontal synchronizing pulses. This signal is represented in Figs. 4 and 5 by the curves G and G'. For the purpose of converting this 15.75 kilocycle frequency signal to one having half that frequency, the output of the cathode follower 21 is coupled by means of a capacitor 90 to a flip-flop circuit 91, illustrated as an Eccles-Jordan trigger circuit. The Eccles-Jordan trigger circuit, commonly referred to as a flip-flop circuit, is well understood by those skilled in the art and is a circuit possessing two conditions of stable equilibrium. As illustrated, it comprises two triodes 92 and 93. One condition of stable equilibrium is when the triode 92 is conducting and the triode 93 is cut off. The other condition of the stable equilibrium is when the triode 93 is conducting and the triode 92 is cut off. In effect, the output of the flip-flop circuit 91 is represented by the curve diagram H shown in Figs. 4 and 5, and, effectively, is a square wave having one-half the frequency of the input pulses. In other words, the output of the flip-flop circuit 91 is effectively a signal having a frequency of 7.88 kilocycles. For the purpose of narrowing the pulses delivered at the output terminals of the flip-flop circuit 91 to pulses which can be applied as a modulation component to the absorption modulator circuit 14, the output of the flip-flop circuit 91 is coupled to a one shot multivibrator 22, which may be identical with the one shot multivibrator bearing the same reference numeral disclosed in Fig. 1 of the drawings. If desired, an R-C differentiating circuit may be used in lieu of the multivibrator 22 for the same purpose. The output of the one shot multivibrator 22 will be as indicated by the curve J in Figs. 4 and 5 of the drawings. It will be apparent that this output comprises a series of negative pulses of one-half the frequency of the output of the cathode follower 21. This output is supplied through a suitable coupling capacitor 96 and the first set of lockout contacts 67*b* of the relay 67 to the conductor 48 connected to the absorption modulator 14. It will readily be appreciated that whenever the contacts 67*b* are closed and a signal represented by the curve G is supplied to the cathode follower, the absorption modulator 14 will have impressed thereon a signal represented by the curve J. Moreover, when the resonant frequency of the absorption modulator 14 coincides with the frequency tuned in by the receiver 11, the absorption modulator is effective to produce a modulation component on the incoming television signal, with the result that there will be supplied to the cathode follower 21 in addition to the 15.75 kilocycle signal a modulation component having a frequency of 7.88 kilocycles.

It will readily be apparent that if means are provided to detect the existence of a 7.88 kilocycle signal existing at the output of the cathode follower 21, the tuning condition of the receiver 11 may readily be determined, since this 7.88 kilocycle signal will not exist unless there is a predetermined relationship between the frequency of the absorption modulator 14 and the signal selected by the receiver 11. Accordingly, there is provided detecting means comprising a tuned circuit 99, an amplifier 100, and a detector 64, which may be identical with the detector shown in Fig. 1 of the drawings. As specifically illustrated in Fig. 4, the tuned circuit 99 comprises a capacitor 101 and the winding 102, which serves as the secondary winding for a transformer 97, having a low impedance primary winding 103 in the cathode circuit of the cathode follower 21. Preferably, the transformer windings 102 and 103 are wound over a powdered iron core so as to provide a very high Q circuit.

For a purpose which will become apparent as the following description proceeds, the tuned circuit 99 comprising the inductance 102 and the capacitance 101 is tuned to a frequency of 15.75 kilocycles. However, connected to the tuned circuit 99 through contacts 67*d* of the relay 67 is another capacitor 104 having one terminal thereof grounded. In effect, the capacitor 104 is in parallel with the capacitor 101 when the contacts 67*d* of the relay 67 are closed. Under these conditions the tuned circuit 99 is resonant at 7.88 kilocycles. When the contacts 67*d* are open, the tuned circuit 99 is resonant at 15.75 kilocycles. The output of the tuned circuit 99, in the event that the contacts 67*d* are open, will be a sine wave signal having a frequency of 15.75 kilocycles, represented by the curve K in Fig. 5 of the drawings. When the contacts 67*d* are closed, the output of the tuned circuit 99 will have a frequency of 7.88 kilocycles, represented by the curve L in Fig. 5 of the drawings. The output of the tuned circuit 99 is coupled through a suitable coupling capacitor 106 with the amplifier 100. which, in turn, is coupled by means of a capacitor 107 to the detector 64. The detector 64 applies a negative bias to the control electrode of the relay control tube 65 both when a 15.75 kilocycle signal is supplied to the amplifier 100 and the contacts 67*d* are open, or a 7.88 kilocycle frequency is supplied to the amplifier 100 and the contacts 67*d* are closed. As in the preceding embodiment, the relay 67 is energized when no negative bias is applied to the relay control tube 65 from the detector 64. Let it be assumed that the relay 67 is energized and in the position shown in Fig. 4 of the drawings. Under these conditions the motor control contacts 67*a* of relay 67 are closed and the motor 70 rotates at one revolution per minute or any other desired speed to cause the absorption modulator circuit 14 to sweep the television frequency spectrum. As soon as the receiver 11 is tuned to a particular channel, synchronizing signals of the form shown by the curve G will be supplied to the cathode follower 21. Since the relay 67 is energized, the contacts *67d* are closed, which means that the tuned circuit 99 is tuned to 7.88 kilocycles. Consequently, no negative bias is applied to the relay control tube 65 as long as there is no frequency coincidence between the incoming television signal and the resonant frequency of the absorption modulator circuit 14. When the motor 70 causes the absorption modulator circuit to reach a frequency coincidence with the signal tuned in by the receiver 11, the 7.88 kilocycle frequency produced at the output of the one shot multivibrator 22 is applied to the incoming television signal and appears at the output of the cathode follower 21. This 7.88 kilocycle signal will be detected as a negative bias by the detector 64 and applied to the relay control tube 65 to cause deenergization of the relay 67, thus opening the contacts *67a*, *67b* and *67d*. This stops the motor 70 at a position indicative of the tuning condition of the receiver 11. Preferably, the motor 70 will have connected thereto a suitable recording mechanism such as 76 shown in Fig. 1 of the drawings. Opening of the contacts 67*b* removes the source of modulation applied to the absorption modulator circuit 14. Moreover, to render the absorption modulator circuit 14 ineffective under these conditions, the contacts *67c* of the relay 67 are closed upon deenergization of the relay 67 to apply a constant potential such as a potential from the +B source 24, thereby maintaining the diode 18 conductive while the contacts *67c* are closed. Upon opening of the contacts 67*d*, the tuned circuit 99 is made resonant at 15.75 kilocycles, so that the presence of the horizontal synchronizing pulses will maintain a negative bias on the control electrode of the relay 65, with the result that the relay 67 remains deenergized. Only upon a retuning of the receiver 11 causing a momentary disappearance of the 15.75 kilocycle horizontal synchronizing signal will the relay 67 be energized to recycle the receiver monitoring means 87.

The circuit described in Fig. 4 will operate satisfactorily as shown. In the event that the flip-flop circuit 91 tends to respond to every other pulse of curve G′, which is the half frequency signal, or, in other words, the 7.88 kilocycle signal, before the detector 64 has caused the relay 67 to become deenergized, a suitable clipper circuit may be interposed between the cathode follower 21 and the flip-flop circuit 91, thereby wiping out the difference in amplitude of successive pulses.

In view of the detailed description included above, the operation of the arrangement disclosed in Fig. 4 of the drawings will readily be understood. It will, moreover, be appreciated that without the use of any separate oscillator, a modulating signal synchronous with the horizontal synchronizing pulses is applied to the incoming signal.

In Fig. 6 of the drawings there is illustrated what is believed at present to be the preferred embodiment of the present invention. It is very similar to Fig. 4, and involves a considerably simplified circuit. The circuit of Fig. 6 recognizes the fact that there normally exist slight irregularities in the amplitude of successive synchronizing pulses, and utilizes the existence of such slight irregularities to aggravate these irregularities in a manner to produce a signal having a frequency half that of the horizontal synchronizing signal. The corresponding parts of Fig. 6 are represented by the same reference numerals as in Fig. 4, and the elements of Fig. 6 are substantially identical with those of Fig. 4, except that the flip-flop circuit 91 and one shot multivibrator 22 are completely eliminated, and, instead, the output of the amplifier 100 is fed directly through the contacts *67b* and the conductor 48 to the absorption modulator 14. Also, a double pole-double throw polarity reversing switch 116 is inserted between the output terminals of the cathode follower 21, and the terminals of the transformer primary winding 103. The cathode follower 21 is preferably located close to the receiver 11 and may be in a small housing separate from the bulk of the equipment required for the metering circuit of Fig. 6. A suitable cable may connect the cathode follower 21 within its small housing which may actually be disposed within the cabinet of the receiver 11, to the associated metering equipment. This cable will, of course, supply heater and plate current to the various parts of the metering equipment, as well as supplying the horizontal synchronizing signals from the cathode follower 21 to the tuned circuit 99. As in the preceding embodiment, the tuned circuit 99 is resonant at either 15.75 kilocycles or 7.88 kilocycles, depending upon the condition of the contacts *67d* of the relay 67.

In accordance with the present invention, the output of the amplifier 100 is connected through coupling capacitor 115 to the absorption modulator circuit 14. When the relay 67 is energized, the resonant circuit 99 is tuned to a frequency of 7.88 kilocycles, and, since the horizontal synchronizing signals have a frequency of 15.75 kilocycles, no sine wave signal will be obtained at the tuned circuit 99. This is because the successive pulses of the synchronizing signals are substantially equal in amplitude, so that there is no half frequency component thereof available to build up an output voltage at the output of the tuned circuit 99. However, when the absorption modulator circuit 14 is "on tune," or, in other words, the resonant frequency thereof coincides with the frequency tuned in by the receiver 11, any slight irregularity in amplitude of successive horizontal synchronizing pulses tends to build up a very small component of a frequency of 7.88 kilocycles at the output of the tuned circuit 99 which is amplified by the amplifier 100. This 7.88 kilocycle component will tend to aggravate the irregularity and gradually build up a 7.88 kilocycle frequency component. This can best be understood by considering the situation where one synchronizing pulse is slightly greater in amplitude than the preceding horizontal synchronizing pulse. This slight difference would cause a 7.88 kilocycle frequency component to be produced, which component is amplified by the amplifier 100 and superimposed on the incoming television signal. The action of the modulating diode 18 would tend to cause greater absorption effect during the next horizontal synchronizing pulse. The regenerative loop consisting of the transmission line 13, the television receiver 11 and the metering circuit, causes a condition to be rapidly built up whereby every other horizontal synchronizing pulse is decreased in amplitude or even obliterated, all in the manner illustrated by the curve G′ in Fig. 5 of the drawings. Under these conditions there is rapidly built up a substantial voltage of a frequency of 7.88 kilocycles at the tuned circuit 99. At the plate of the tube of the amplifier 100 this voltage is of sine wave shape during the initial stage of the build-up process, but later becomes substantially rectangular in shape because of the overload of the electron discharge valve 118 in the amplifier circuit 100. As the voltage at the plate circuit of the electron discharge valve 118 builds up, it is rectified by the detector 64 in the form of a negative bias applied to the relay control tube 65. As soon as this negative bias builds up sufficiently, the tube 65 is cut off, with the result that the relay 67 is deenergized. Thereupon, the circuit functions in an identical manner with that already described in Fig. 4, since the tuned circuit 99 is now converted to one resonant at 15.75 kilocycles, and the horizontal synchronizing signals supplied to the cathode follower 21 provide the necessary bias for the relay control tube 65 to maintain the relay 67 deenergized so long as the horizontal synchronizing signals continue to exist. It will be apparent that it is undesirable for the absorption modulator 14 to continue to absorb energy from the incoming television signal, and to this end the contacts *67c* are closed to apply positive potential to the plate of the diode 18, thereby causing it to conduct continually, whereby no further energy is absorbed by the absorption modulator circuit 14, and there is no likelihood of impairing the performance of the receiver 11.

In actual practice it has been found that the effectiveness of the above-described regenerative modulating channel, comprising the components 21, 97, 100, 115 and 14, varies to a considerable extent depending upon the polarity of the pulse input to the transformer 97. To select the most effective polarity, a suitable current measuring device 117 is inserted between the bottom terminal of the choke coil 47 and ground, and the switch 116 is thrown to the position which produces the largest current flow through the measuring device 117.

It should be noted that in each of the three disclosed embodiments of the invention, each synchronizing pulse derived from the receiver 11 produces the modulating pulse for modulating the next succeeding synchronizing pulse or the following "back porch" pedestal portion of the received signal. Thus and referring again to Figs. 1 and 2, for example, the synchronizing pulse 1 derived from the receiver 11 produces the modulating pulse X1 which immediately follows the synchronizing pulse 2 of the received signal. This time delay between the derived synchronizing pulse and the resulting modulating pulse is largely produced by the multivibrator 22 and the differentiator 30. If necessary, conventional adjustable pulse delay means may be inserted in the channel to obtain exact coincidence between the modulating pulses and the "back porch" pedestal portions of the received signal. As indicated above, the same delay feature is present in the modulating pulse forming channels of the system arrangements shown in Figs. 4 and 6.

In view of the detailed description included above, the operation of the arrangement disclosed in Fig. 6 will readily be appreciated by those skilled in the art.

It will be understood that instead of employing a variable capacitor in the absorption modulator circuit 14, as described in the various embodiments of the present invention, a plurality of fixed tuned circuits successively coupled with the transmission line 13, as disclosed and claimed in the copending Freeman application filed concurrently with the instant application, is preferable, and the particular arrangement disclosed is merely for the purpose of illustrating the present invention. In the arrangement of Fig. 1 of the drawings, an innocuous modulation is applied to the circuit, and, hence, no lockout arrangement is necessary. In the other two embodiments of the invention, a lockout arrangement is provided to prevent any impairment of performance of the receiver 11. In the embodiments of Figs. 1, 4 and 6, a modulation component synchronous with the horizontal synchronizing signals is employed. In all of the embodiments of the present invention, the modulating voltage is provided by utilizing a portion of the television receiver. Obviously, the modulation voltage might be provided by an oscillator which does not contain any portion of the television receiver as a component. Such an arrangement is also disclosed in the copending Freeman application.

In the present invention the modulation is accomplished by taking energy away from the incoming television signal. Obviously, it is possible to effect modulation by increasing the energy content of the incoming television signal, as, for example, by means of a modulated amplifier inserted in series with the transmission line connecting the receiver with its antenna. It is intended in the appended claims to cover any modulation arrangement whether energy is absorbed or added to the incoming television signal.

While there have been illustrated and described several embodiments of the present invention, it will readily be understood that various changes and modifications will occur to those skilled in the art. It is intended in the appended claims to cover all changes and modifications of the present invention which fall within the true spirit and scope thereof.

What is claimed as new and desired to be secured by Letters Patent of the United States is:

1. In combination with a wave signal receiver which is tunable over a predetermined frequency range to receive signals radiated by different transmitters operating at different frequencies within said range, said receiver being provided with a tunable high frequency section into which signal energy received from any one of said transmitters is introduced, signal control means operative at any selected tuned condition of said receiver and responsive to signal energy derived from said receiver for altering the signal energy introduced into the high frequency section of said receiver from one of said transmitters to produce a measurable response in said receiver, and means linked to said receiver and responsive to the production of said measurable response in said receiver for producing an indication of the transmitter to which said receiver is tuned for signal reception.

2. In combination with a wave signal receiver which is tunable over a predetermined frequency range to receive signals radiated by different transmitters operating at different frequencies within said range, said receiver being provided with a tunable high frequency section into which signal energy received from any one of said transmitters is introduced, a circuit for extracting signal energy from said receiver when said receiver is tuned to receive signals from one of said transmitters, signal control means operative at any selected tuned condition of said receiver and responsive to the signal energy extracted from said receiver by said circuit for altering the signal energy introduced into the high frequency section of said receiver from said one transmitter to produce a measurable response in said receiver, and means linked to said receiver and responsive to the production of said measurable response in said receiver for producing an indication of the transmitter to which said receiver is tuned for signal reception.

3. The combination set forth in claim 2 in which are provided means responsive to the production of the measurable response in said receiver for rendering the signal control means ineffective to alter the signal energy introduced into the high frequency section of the receiver.

4. In combination with a wave signal receiver which is tunable over a predetermined frequency range to receive signals radiated by different transmitters operating at different frequencies within said range, said receiver being provided with an antenna circuit and a tunable high frequency section into which signal energy received by said antenna circuit from any one of said transmitters is introduced, means operative at any selected tuned condition of said receiver and responsive to signal energy derived from said receiver and including a circuit coupled to said antenna circuit for altering the signal energy introduced into the high frequency section of said receiver from one of said transmitters to produce a measurable response in said receiver, and means linked to said receiver and responsive to the production of said measurable response in said receiver for producing an indication of the transmitter to which said receiver is tuned for signal reception.

5. In combination with a wave signal receiver which is tunable over a predetermined frequency range to receive signals radiated by different transmitters operating at different frequencies within said range, said receiver being provided with an antenna circuit and a tunable high frequency section into which signal energy received by said antenna circuit from any one of said transmitters is introduced, a circuit for extracting signal energy from said receiver when said receiver is tuned to receive signals from one of said transmitters, signal control means operative at any selected tuned condition of said receiver and responsive to the signal energy extracted from said receiver by said circuit and including a second circuit coupled to said antenna circuit for altering the signal energy introduced into the high frequency section of said receiver from said one transmitter to produce a measurable response in said receiver, and means linked to said receiver and responsive to the production of said measurable response in said receiver for producing an indication of the transmitter to which said receiver is tuned for signal reception.

6. The combination set forth in claim 5 in which are provided means responsive to the production of the measurable response in the receiver for rendering the signal control means ineffective to alter the signal energy introduced into the high frequency section of the receiver.

7. In combination with a wave signal receiver which is tunable over a predetermined frequency range to receive signals radiated by different transmitters operating at different frequencies within said range, said receiver being provided with a tunable high frequency section into which signal energy recevied from any one of said transmitters is introduced, signal control means operative at any selected tuned condition of said receiver and responsive to signal energy derived from said receiver for altering the signal energy introduced into the high frequency section of said receiver from one of said transmitters to produce a measurable response in said receiver, means linked to said receiver and responsive to the production of said measurable response in said receiver for producing an indication of the transmitter to which said receiver is tuned for signal reception, and means responsive to production of said measurable response in said receiver for rendering said signal control means ineffective to alter the signal energy introduced into the high frequency section of said receiver.

8. In combination with a wave signal receiver which is tunable over a predetermined frequency range to receive signals radiated by different transmitters operating at different frequencies within said range, said receiver being provided with an antenna circuit and a tunable high frequency section into which signal energy received by said antenna circuit from any one of said transmitters is introduced, means operative at any selected tuned condition of said receiver and responsive to signal energy derived from said receiver and including a circuit coupled to said antenna circuit for altering the signal energy introduced into the high frequency section of said receiver from one of said transmitters to produce a measurable response in said receiver, means linked to said receiver and responsive to the production of said measurable response in said receiver for producing an indication of the transmitter to which said receiver is tuned for signal reception, and means responsive to production of said measurable response in said receiver for rendering said signal control means ineffective to alter the signal energy introduced into the high frequency section of said receiver.

9. In combination with a television receiver which is tunable over a predetermined frequency range to receive signals radiated by a plurality of different television transmitters operating at respectively different frequencies within said range, each of said signals comprising successively means for selecting and altering only the synchronizing component, and spaced picture components, means linked to said receiver and responsive to the altered synchronizing component for producing an indication of the transmitter to which said receiver is tuned for signal reception.

10. In combination with a television receiver which is tunable over a predetermined frequency range to receive signals radiated by different television transmitters operating at different frequencies within said range, each of said signals including spaced synchronizing pulses each having pedestal intervals on each side thereof, means for selectively placing a unique signal on the pedestal of a selected one of said signals, and means linked to said receiver and responsive to the reproduction of signal components during the pedestal intervals of a received signal for producing an indication of the transmitter to which said receiver is tuned for signal reception.

11. In combination with a television receiver which is tunable over a predetermined frequency range to receive signals radiated by different television transmitters operating at different frequencies within said range, each of said signals comprising successively spaced picture components, means linked to said receiver and responsive to the reproduction of received signal components therein for modulating the received signal with control components during the spaces between the picture components of the received signal, and means linked to said receiver and responsive to the reproduction of said control components therein for producing an indication of the transmitter to which said receiver is tuned for signal reception.

12. In combination with a television receiver which is tunable over a predetermined frequency range to receive signals radiated by different television transmitters operating at different frequencies within said range, each of said signals including spaced synchronizing pulses each having pedestal intervals on each side thereof, means linked to said receiver and responsive to the reproduction of received signal components therein for modulating the received signal with control components during said pedestal intervals, and means linked to said receiver and responsive to the reproduction of said control components therein for producing an indication of the transmitter to which said receiver is tuned for signal reception.

13. In combination with a television receiver which is tunable over a predetermined frequency range to receive signals, each including a synchronizing component, radiated by different television transmitters operating at different frequencies within said range, means for altering only the synchronizing components of a selected one of said signals, means for extracting the synchronizing components of a received signal from said receiver, and means responsibe to the extracted synchronizing components by said last-named means for producing an indication of the transmitter to which said receiver is tuned for signal reception.

14. In combination with a television receiver which is tunable over a predetermined frequency range to receive signals, each including synchronizing pulses, radiated by different television transmitters operating at different frequencies within said range, said receiver being provided with a tunable high frequency section into which signal energy received from any one of said transmitters is introduced, means for extracting the synchronizing pulses of a received signal from said receiver, means for converting said synchronizing pulses into modulating pulses, modulating means for utilizing said modulating pulses to modulate the signal energy introduced into the high frequency section of said receiver to produce a measurable response in said receiver, and means linked to said receiver and responsive to the production of said measurable response in said receiver for producing an indication of the transmitter to which said receiver is tuned for signal reception.

15. The combination set forth in claim 14 in which are provided means independent of said receiver and responsive to the production of the measurable response in the receiver for rendering the modulating means ineffective to modulate the signal energy introduced into the high frequency section of the receiver until said receiver is retuned.

16. In combination with a television receiver which is tunable over a predetermined frequency range to receive signals, each including synchronizing pulses, radiated by different television transmitters operating at different frequencies within said range, said receiver being provided with an antenna circuit and a tunable high frequency section into which signal energy received by said antenna circuit from any one of said transmitters is introduced, means linked to said receiver for extracting the reproduced synchronizing pulses of a received signal from said receiver, means for converting said extracted synchronizing pulses into modulating pulses, modulating means coupled to said antenna circuit and excited by said modulating pulses for modulating the signal energy introduced into the high frequency section of said receiver to produce a measurable response in said receiver, and means linked to but independent of said receiver and responsive to the production of said measurable response in said receiver for producing an indication of the transmitter to which said receiver is tuned for signal reception.

17. In combination with a television receiver which is tunable over a predetermined frequency range to receive signals radiated by different television transmitters operating at different frequencies within said range, each of said signals including synchronizing pulses which occur repetitively at a predetermined frequency, said receiver being provided with a tunable high frequency section into which signal energy received from any one of said transmitters is introduced, means linked to said receiver for extracting the reproduced synchronizing pulses of a received signal from said receiver, means responsive to said synchronizing pulses for producing modulating pulses which occur repetitively at a fraction of said predetermined frequency, modulating means excited by said modulating pulses for correspondingly modulating the signal energy introduced into the high frequency section of said receiver, and means linked to said receiver and responsive to reproduction of said modulation pulses in said receiver for producing an indication of the transmitter to which said receiver is tuned for signal reception.

18. The combination set forth in claim 17 in which the means responsive to reproduction of the modulation pulses includes a circuit tuned to resonance at the fraction of the predetermined frequency to provide a voltage for controlling the production of an indication of the transmitter to which the receiver is tuned for signal reception.

19. In combination with a television receiver which is tunable over a predetermined frequency range to receive signals radiated by different television transmitters operating at different frequencies within said range, each of said signals including synchronizing pulses which occur repetitively at a predetermined frequency, said receiver being provided with a tunable high frequency section into which signal energy received from any one of said transmitters is introduced, means linked to said receiver for extracting the reproduced synchronizing pulses of a received signal from said receiver, means responsive to said synchronizing pulses for producing modulating pulses which occur repetitively at a fraction of said predetermined frequency, modulating means excited by said modulating pulses for correspondingly modulating the signal energy introduced into the high frequency section of said receiver, means linked to said receiver and responsive to reproduction of said modulating pulses in said receiver for producing an indication of the transmitter to which said receiver is tuned for signal reception and for rendering said modulating means ineffective to modulate the signal energy introduced into the high frequency section of said receiver, and means responsive to retuning of said receiver for again rendering said modulating means effective to modulate signal energy introduced into the high frequency section of said receiver.

20. In combination with a television receiver which is tunable over a predetermined frequency range to receive signals radiated by different television transmitters operating at different frequencies within said range, each of said signals including synchronizing pulses which occur repetitively at a predetermined frequency, said receiver being provided with a tunable high frequency section into which signal energy received from any one of said transmitters is introduced, means linked to said receiver for extracting the reproduced synchronizing pulses of a received signal from said receiver, means responsive to said synchronizing pulses for producing modulating pulses which occur repetitively at a fraction of said predetermined frequency, modulating means excited by said modulating pulses for correspondingly modulating the signal energy introduced into the high frequency section of said receiver, a tuned circuit coupled to said receiver for excitation by said modulation pulses, said tuned circuit normally being tuned to resonance at said fraction of said predetermined frequency such that a voltage is developed thereacross in response to the excitation thereof by said modulation pulses, control means operative in response to said voltage to retune said circuit to said predetermined frequency and thus render said circuit operative to maintain said voltage through excitation thereof by the synchronizing pulses reproduced in said receiver, means responsive to operation of said control means for rendering said modulating means ineffective to modulate the signal energy introduced into the high frequency section of said receiver, and indicating means for producing an indication of the transmitter to which said receiver is tuned in response to operation of said control means.

21. In combination with a television receiver which is tunable over a predetermined frequency range to receive signals radiated by different television transmitters operating at different frequencies within said range, each of said signals including synchronizing pulses which occur repetitively at a predetermined frequency, said receiver being provided with an antenna circuit and with a tunable high frequency section into which signal energy received from any one of said transmitters is introduced, a channel coupled between said receiver and said antenna circuit for excitation by synchronizing pulses reproduced in said receiver and operative regeneratively to modulate said synchronizing pulses at a fraction of said predetermined frequency, and means responsive to said modulation of said synchronizing pulses for producing an indication of the transmitter to which said receiver is tuned for signal reception.

22. In combination with a television receiver which is tunable over a predetermined frequency range to receive signals radiated by different television transmitters operating at different frequencies within said range, each of said signals including synchronizing pulses which occur repetitively at a predetermined frequency, said receiver being provided with an antenna circuit and with a tunable high frequency section into which signal energy received from any one of said transmitters is introduced, a channel coupled between said receiver and said antenna circuit for excitation by synchronizing pulses reproduced in said receiver and operative regeneratively to modulate said synchronizing pulses at a frequency equal to one half said predetermined frequency, said channel including a tuned circuit normally tuned to resonance at a frequency equal to one half said predetermined frequency such that a voltage is developed thereacross in response to said modulation of said synchronizing pulses, control means operative in response to said voltage to retune said circuit to said predetermined frequency and thus render said tuned circuit operative to maintain said voltage through excitation thereof by the synchronizing pulses reproduced by said receiver and impressed upon said channel, means responsive to operation of said control means for interrupting said channel at a point following said tuned circuit, and indicating means for producing an indication of the transmitter to which said receiver is tuned in response to operation of said control means.

References Cited in the file of this patent

UNITED STATES PATENTS

| | | |
|---|---|---|
| 2,472,957 | Nicholson | June 14, 1949 |
| 2,513,360 | Rahmel | July 4, 1950 |
| 2,662,168 | Scherbatskoy | Dec. 8, 1953 |
| 2,766,374 | Hoffmann | Oct. 9, 1956 |

UNITED STATES PATENT OFFICE

CERTIFICATE OF CORRECTION

Patent No. 2,935,557 May 3, 1960

Stephen F. Bushman

It is hereby certified that error appears in the printed specification of the above numbered patent requiring correction and that the said Letters Patent should read as corrected below.

Column 1, line 53, for "received" read -- receiver --; column 8, line 56, for "assignee at" read -- assignee as --; column 15, line 19, for "recevied" read -- received --; line 61, strike out "spaced picture components," and insert the same before "means" in line 60, same column; column 16, line 38, for "responsibe" read -- responsive --.

Signed and sealed this 25th day of October 1960.

(SEAL)
Attest:

KARL H. AXLINE
Attesting Officer

ROBERT C. WATSON
Commissioner of Patents